(12) United States Patent
Meunier et al.

(10) Patent No.: US 6,688,341 B1
(45) Date of Patent: Feb. 10, 2004

(54) WEIGHT-FILLING MACHINE COMPRISING A WEIGHING STATION

(75) Inventors: Eric Meunier, Le Havre Cedex (FR); Gérard Sabiron, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 10/030,540

(22) PCT Filed: Jul. 21, 2000

(86) PCT No.: PCT/FR00/02096

§ 371 (c)(1),
(2), (4) Date: Oct. 8, 2002

(87) PCT Pub. No.: WO01/07876

PCT Pub. Date: Feb. 1, 2001

(30) Foreign Application Priority Data

Jul. 23, 1999 (FR) .............................. 99 09694

(51) Int. Cl.[7] .............................. B65B 1/32; B65B 3/28
(52) U.S. Cl. ......................... 141/83; 141/165; 141/372
(58) Field of Search .......................... 141/83, 165, 369, 141/370, 372

(56) References Cited

U.S. PATENT DOCUMENTS

| 5,456,297 A | * | 10/1995 | Crossdale et al. ............ 141/83 |
| 6,073,667 A | * | 6/2000 | Graffin ........................ 141/372 |
| 6,399,901 B1 | * | 6/2002 | Nishino et al. ............... 177/52 |

* cited by examiner

*Primary Examiner*—Gene Mancene
*Assistant Examiner*—Peter de Vore
(74) *Attorney, Agent, or Firm*—Sughrue Mion, PLLC

(57) ABSTRACT

The invention concerns a weight-filling machine wherein a force sensor consists of a deformable component having a base end (16) linked to a frame and an interface end (18) whereon is fixed a device for gripping (50) the container. The invention is characterised in that the gripping device (50) is coupled to the interface end by elastic means (72) urging the gripping device (50) towards a normal position wherein it is supported on a support surface (78) linked to the interface end (18), and the gripping device (50) is mobile relative to the interface end (18) along a protective direction, countering the elastic means (72), up to a stop position wherein it comes in contact with a stop surface (90) linked to the frame (86).

13 Claims, 3 Drawing Sheets

WEIGHT-FILLING MACHINE COMPRISING A WEIGHING STATION

The invention relates to a weight-filling machine for containers, meaning a machine in which the end of the filling of the container is determined based on the change in said container's weight in order to obtain a predetermined quantity of product inside the latter.

The invention relates more specifically to a weight-filling machine of the type in which a container to be filled is carried by a gripping device that is supported by a force sensor, and of the type in which the force sensor consists of a deformable component with a base end linked to a frame and an interface end on which is attached the gripping device.

Such a machine is for example described in the document of patent FR-A-2.770.292.

In this type of machine a gripping device carries the container. Said device can be tongs that are able to grab the container by the neck, as in the above-mentioned document, or a seat on which the container is placed. In both cases, the gripping device usually comprises additional means that guide the body of the container in order to guarantee its precise positioning.

Of course, the container gripping device must be supported by the force sensor in order for the latter to be entirely subjected to the weight of the container without there being any interference with other components of the machine.

Also, all forces sustained by the gripping device are fully retransmitted to the sensor.

However, the container transfer means that make it possible to bring the empty container to the gripper device and remove it once it is filled can malfunction. Said malfunctions can then be translated by the fact that significant forces are exerted on the gripping device and therefore on the sensor. Yet, it is provided that the force sensor be able to sustain forces relative to the weight of the containers it measures. Beyond that, it can sustain irreversible deformations that make it unusable and could even make it break.

Therefore, the object of the invention is to propose a new weight-filling machine design that makes it possible to effectively protect the sensor without changing in any way the precision with which it measures.

With this end in view, the invention proposes a machine of the type described previously, characterized in that the gripping device is linked to the interface end Using elastic means that urge the gripping device towards a normal position in which it rests on a support surface linked to the interface end, and in that the gripping device is mobile relative to the interface end along a protective direction, countering the elastic means, up to a stop position in which it comes in contact with a stop surface linked to the frame.

Based on other characteristics of the invention:
- the gripping device is mounted on the interface end so as to be able to slide in relation to the interface end along a protection direction between its normal position and its stop position;
- the protection direction is more or less horizontal;
- the gripping device extends from the interface end along the protection direction in such a way that the container is out of plumb relative to the sensor;
- the gripping device is mounted so that it slides on a cylindrical guide bar that is integral with the sensor's interface end;
- rotary blocking means are provided for the gripping device in relation to the sensor around the guide bar axis;
- the weight sensor is a constant time sensor in the shape of a body that is equipped with at least one central lightening hole so that both ends are linked to each other by cross bars that are more or less parallel and whose junctions with the ends are deformable in order to form hinge points, and the cross bars are more or less parallel to the protection direction;
- the gripping device and the frame delimit between them a tight compartment inside which the force sensor is set;
- a flexible bellows that links the gripping device to the frame guarantees the tightness of the compartment.

Other characteristics and advantages of the invention will become apparent from reading the following detailed description as well as from the attached drawings where:

Figure 1:
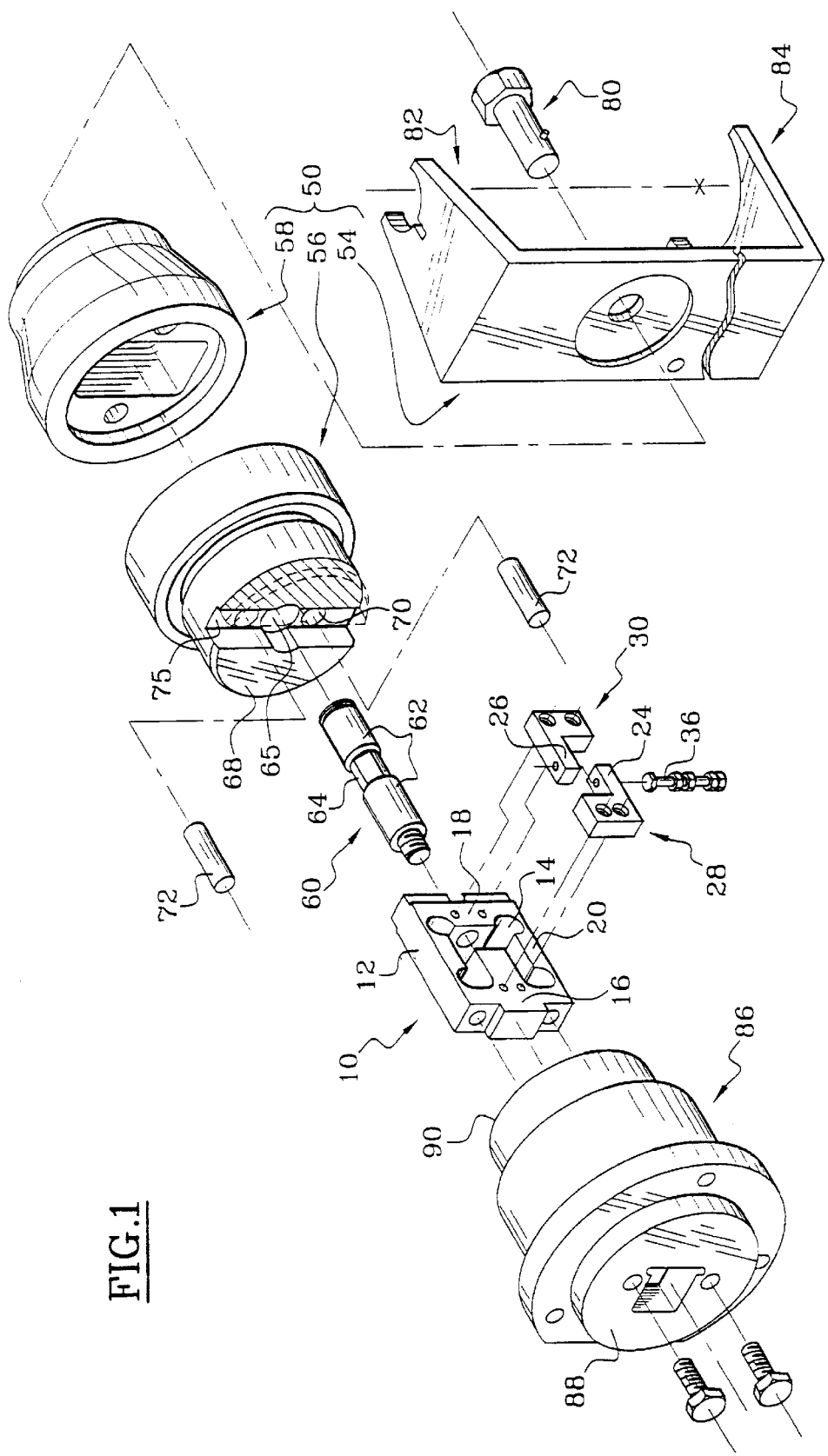
FIG. 1 is a cutaway perspective view of the main components of a weighing station for a filling machine that is consistent with the teachings of the invention.
Figure 2:
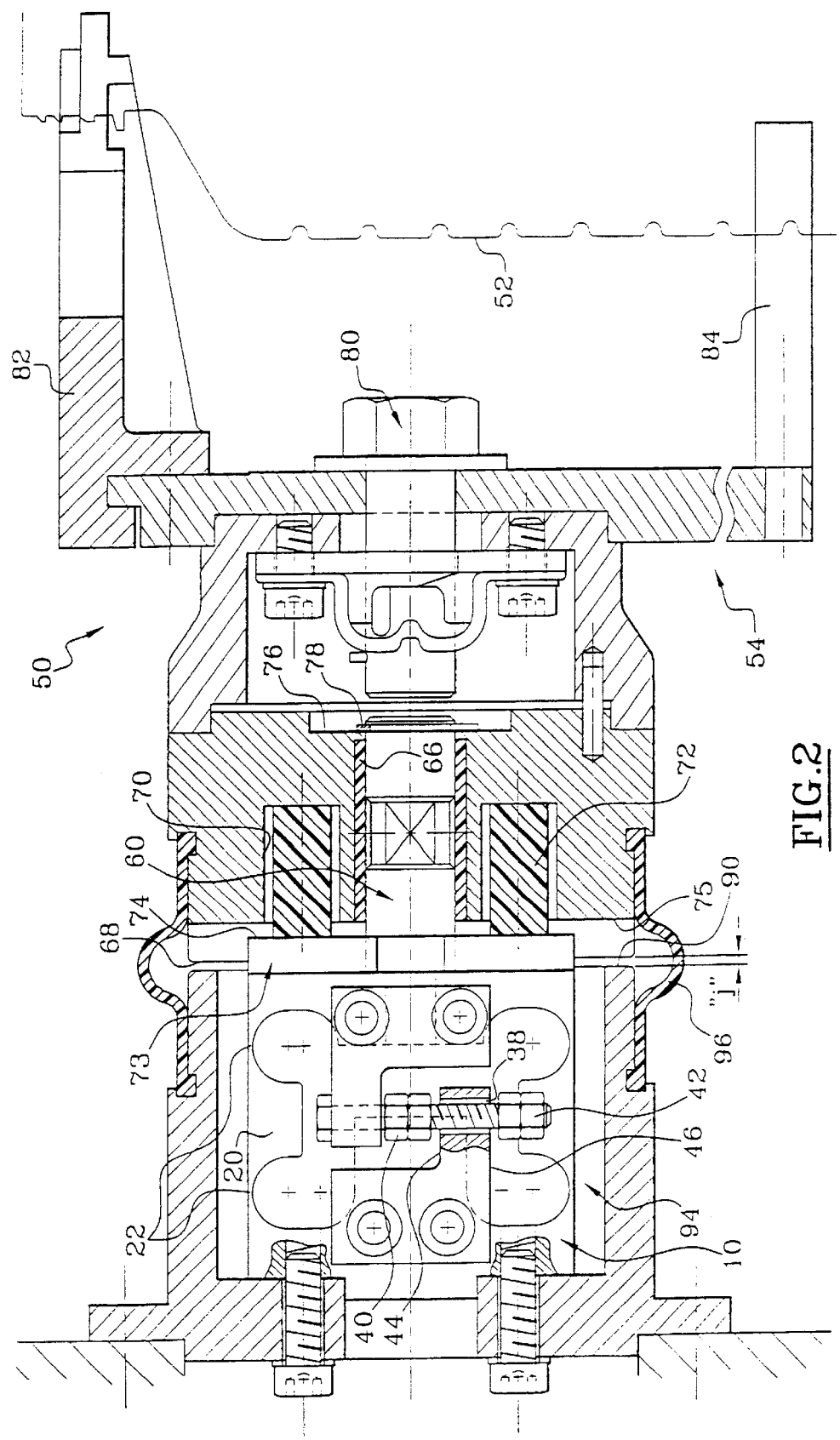
FIGS. 2 and 3 are sectional views of the weighing station from FIG. 1, where said station is in a normal use position and a protection position respectively.
Figure 3:
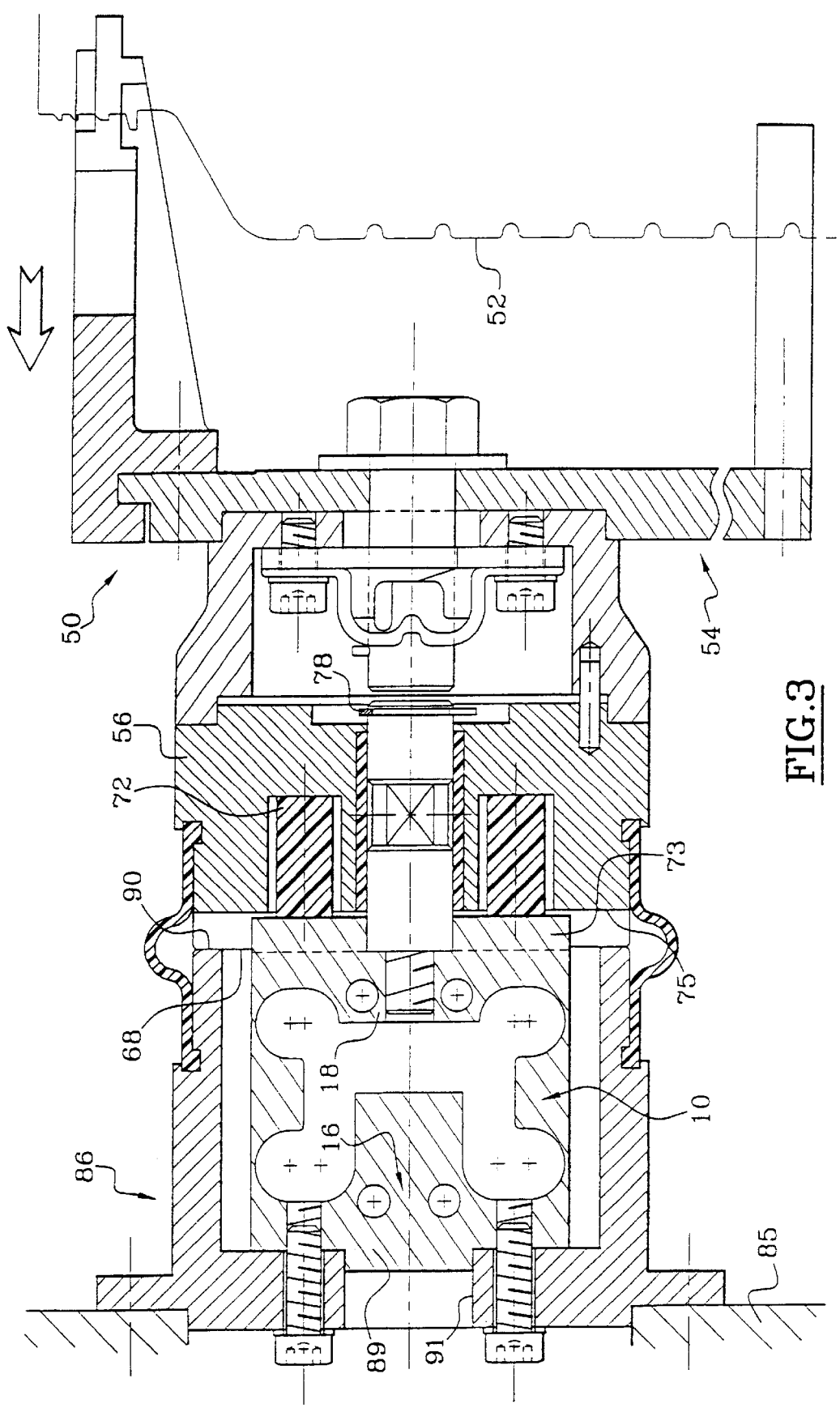

In FIGS. 1 through 3 we have shown the main components of a weighing station for a container weight-filling machine. The machine may for example be a rotary carrier machine in which the carrier is equipped with several container filling stations, where each filling station consists namely of a weighing station, a filling spout and a distribution system equipped with a valve that is controlled based on the weight of the container.

The weighing station consists for the most part of a gripping device 50 for the container 52 that is attached to a component of the carrier's frame via a force sensor 10.

The force sensor 10 is a sensor with a deformable body of the type called "constant time".

This sensor has a metallic body 12 that is mostly in the shape of a plate and is equipped with a central lightening hole 14. This lightening hole 14 demarcates, in the body 12, four sides among which we note a base upright 16, used to attach the sensor to a component of the carrier's frame, and an interface upright 18 that is to be linked to the gripping device 50 of the container 52 to be weighed.

Preferably, the two uprights 16, 18 are more or less vertical. The other two sides defined by the lightening hole 14 form cross bars 20 that are more or less horizontal and connect the two uprights. The shape of the lightening hole 14 is such that the areas of junction 22 between the cross bars 20 and the uprights 16, 18 are slimmed down and are therefore particularly deformable in relation to the other sides, which, by comparison, may be considered to be shape-retaining.

The body 12 of the sensor thus forms a quadrilateral that can change its shape and look like a parallelogram when a load is applied on the interface upright 18.

The body of the sensor is arranged in a vertical plane and, under the effect of the container's weight, it only changes shapes within its plane. In such a sensor, we can place strain gages on the tapered areas 22 that fort a hinge so as to be able to deduce, based on their shape change, the intensity of the force that is applied on the sensor, in this case the weight of the recipient.

The gripping device 50 is comprised among others things of a container holder 54, adapted to the shape of the container 52 that is to be filled, a connection platform 56 that makes it possible to connect the gripping device to the sensor, and an intermediary head 58, placed between the container holder 54 and the connection platform 56.

A central rod 60 is screwed into the sensor's interface upright 18 and extends horizontally along its axis A1, in the sensor's plane and toward the front of the latter, meaning in the opposite direction of the frame. Tis rod 50 is comprised, out of plumb in relation to the sensor, of two rotation cylindrical shafts 62 that are separated horizontally by a section with a smaller diameter 64.

The connection platform 56 is a more or less cylindrical rotation platform and has a central bore 65 that allows it to be mounted on the rod 60. Preferably, this assembly includes the interposition of a ring 66 with a low friction coefficient that, combined with the presence of the two shafts 62 of reduced length, makes it possible for the connection platform 56 to move freely on the rod 60. The platform 56 can therefore slide axially on the rod 60. The rear face 68 of the platform 56 has two pockets 70 arranged on either side of the axis A1 in a vertical plane and that are intended to hold elastic plugs or compression springs 72. The elastic plugs are larger than the pockets 70 so that they axially exceed toward the back beyond the rear face 68 of the platform in order to rest against the front edge 74 of the interface upright 18 of the sensor 10.

Thus, the elastic plugs tend to urge the platform axially toward the front. Therefore, under the action of the plugs 72, the platform 56 rests axially by its front face 76 against a slit elastic ring 78 that is mounted in a grove at the front end of the rod 60 and forms a supporting surface linked to the rod 60, thus linked to the interface upright 18 of the sensor 10.

To prevent the platform 56 from rotating around the axis A1 of the rod 60, we can see that the sensor's front edge 74 has the shape of a parallelepiped stretched vertically so as to form a sort of peg 73 meant to fit into an additional vertical grove 75 made in the rear face 68 of the platform 56. The peg 73 is like a front end of reduced thickness of the sensor's body 12. The peg 73 and the grove 75 prevent any rotation of the platform in relation to the sensor 10 around the axis A1 without however preventing the axial sliding of the two parts.

Both for the connection between the platform 56 and the rod 60 and for the anti-rotation connection of the peg 73 and the grove 75, we will try to limit the operational play without however introducing any significant tightening force.

The intermediary head 58 of the gripping device 50 is attached by any appropriate means to the front face 76 of the platform 56, for example using simple screws. In turn, the container holder 54 is attached to the front face of the intermediary head 58, preferably using means that attach quickly such as a "quarter turn" screw 80. This type of attachment will make it possible to quickly change the container holder 54 when we want to change the shape of the containers that are to be filled.

In the example shown, the containers to be filled are PET (polyethylene terephthalate) bottles whose necks have a flange above which there is a gripping groove. The container holder 54 is then comprised of upper tongs 62 that grab the neck of the bottle and engage in the gripping flange, so that the bottle is suspended. The container holder also has a guide stirrup 84 that cooperates with the body of the bottle to hold it directly in line with the upper tongs 82.

However, the invention could also be implemented using a container holder in the shape of a seat on which the container to be filled would simply be placed. Of course, the seat could also be comprised of a guide stirrup for the body and it would advantageously be equipped with a centering device that would act at the level of the neck.

Through the assembly we have just described, we understand that the entire gripping device 50 for containers behaves as one single component that can move axially in relation to the sensor 10, countering however the action of the elastic plugs 72.

Preferably we will chose plugs 72 whose stiffness is sufficient to constantly hold the platform 56 in a resting position against the elastic ring 78 throughout the normal operation of the machine, including when the container engages and disengages from the gripping device.

However, all the forces sustained by the gripping device are reported on the sensor, either through the elastic plugs 72, or through the rod 60. This way, the sensor can measure the weight of the container that the gripping device carries and thus make it possible to determine the quantity of product that is poured into the container through the filling spout.

On the contrary, if too great a force is applied on the gripping device and this force comprises a significant component along a direction that tends to make the gripping device move backwards, the latter may move axially toward the back on the rod 80. In doing so, it will compress the plugs 72.

As set forth in the invention, the gripping device can thus move backwards until it stops against a stop surface that is linked to the frame of the carrier.

In this case, we can see that the weighing station is comprised of a housing 86 that is a rotation tubular housing with an axis A1 and is open at its front end. The housing 86 is fixed on the frame 85 in such a way that it is a component of said frame.

The sensor 10 is held inside the cylindrical compartment 94 that is thus delimited inside the housing 86 and its base upright 16 is fixed on a back wall 88 of the housing 86. For the sensor 10 to be well positioned in relation to the housing 86 and the frame 85, we can see that the sensor's base upright 16 consists of a positioning heal 89 that is held and tightened in an additional pocket 91 of the back wall 91 of the housing 86.

We can se that only the front part in the shape of a peg 73 of the sensor 10 extends outside the housing 86, in front of a front circular edge 90 of the latter.

As can be seen in FIG. 2, in the advanced position of the gripping device, there is an axial clearance "1" between the rear face 68 of the platform 86 and the front edge 90 of the housing 86. On the contrary, when the gripping device has moved backward by a distance "1", the platform comes to rest against the housing, thus against the frame as represented in FIG. 3. Once in this position, the platform can therefore no longer move backward but, most of all, almost the entire excess force along the horizontal component is carried over to the housing and not to the sensor. Therefore, along the horizontal direction, the sensor is only subjected to the force of the elastic plugs 72.

Thus, thanks to the invention, the sensor is protected against abnormal forces felt in a direction such that the sensor's cross bars would be urged to compress. And, it is exactly in this direction that the sensor's junction areas 22 are the most fragile. Indeed, they are then likely to buckle out of shape in such a way that is irreversible.

Advantageously, we anticipate linking the housing 86 to the platform 56 using a flexible cylindrical membrane 96 that acts as a bellows to tightly close the compartment 94 in which the sensor is contained, which protects it from any projection, both during the filling phase and during the cleaning phase of the machine.

Furthermore, we anticipate means that make it possible to protect the sensor 10 from excessive forces from the vertical direction. With this in mind, the sensor is equipped with two stop fingers 24, 26 that each extend horizontally from one of the uprights 16, 18. The fingers 24, 26 are rectangular and each one forms one arm of a bracket 28, 30 that is attached to a lateral face of the corresponding upright 16, 18. Of course, the brackets are attached on one same side of the sensor 10. We can see that each bracket is meant to be attached in a simple manner using two screws that are perpendicular to the sensor's plane, which guarantees accessibility and ease of assembly.

The two fingers 24, 26 thus extend in a same vertical plane that is transversally offset in relation to the vertical plane of the sensor. They are offset from each other along the vertical direction and their lengths are such that, along the horizontal direction, the fingers overlap, at least partially, so that their extremities face each other along the vertical direction. Thus, when the sensor changes shape along the vertical direction, the finger 26 moves with the interface upright 18, where this move is essentially vertical in relation to the finger 24 that is fixed since it is carried by the base upright 16.

In the example shown, the mobile finger 26 linked to the interface upright 18 is arranged over the fixed finger 24 that is linked to the base upright 16.

At the extremity of one of the fingers, in this case finger 26 linked to the interface upright 18, we have attached a threaded rod that extends vertically. Here, this threaded rod has shape of a screw 36 that is screwed through the extremity of the finger 26 and is therefore fixed in relation to the latter. The head of the screw 36 rests against an upper face of the mobile finger 26 whereas its threaded part extends under the finger 26 and through a smooth bore 38 made in the extremity of the fixed finger 24. When the sensor changes shape, the threaded part of the screw can slide freely in the bore 38 in a direction that is more or less vertical if we ignore the horizontal movement induced by the kinematics of the parallelogram.

On the screw 36, are mounted two sets 40, 42 of two nuts of which one 40 is located above the fixed finger 24 and the other 42 is under it. In each set, the two nuts are tightened against each other to from a whole nut/locknut whose position along the screw is frozen. Each of the two sets 40, 42 of nuts is thus likely to come to rest against the fixed finger 24, against the upper 44 and lower 46 faces of the latter respectively and thus form stop faces. Of course, the diameter of the bore 38 is less than that of the nuts 40, 42 so that the latter can act as stop faces linked to the mobile finger 26.

As can be seen in FIG. 2, the two sets 40, 42 of nuts are positioned on the screw 36 in such a way that, in the absence of any load on the sensor, they are each vertically moved away from their corresponding stop face 44, 46. In this way, from this position, the sensor can freely change shapes under the effect of a load applied downward or upward. The distances between the two sets of nuts and their corresponding stop face may be different.

Under the effect of an excessive load toward the top or the bottom, one of the sets of nuts comes to rest against the corresponding stop face of the finger 24. Once in this position, the finger 26 prevents the interface upright 18 from moving any further in the direction of the application of the force, thus setting a limit to the shape change of the sensor.

Of course, this limit can be adjusted through a simple modification of the axial position of one of the sets of nuts on the screw 36.

As we can see, the machine as set forth in the invention is equipped with a weighing station in which the sensor 10 is particularly well protected against abnormally strong forces and against the projection of various products.

What is claimed is:

1. A weight-filling machine for containers, in which a container to be filled is carried by a gripping device that is supported by a force sensor, and of the type in which the force sensor comprises a deformable component with a base end linked to a frame and an interface end on which is fixed the gripping device, characterized in that the gripping device is linked to the interface end by elastic means that urge the gripping device towards a normal position in which it is supported on a support surface that is linked to the interface end, and in that the gripping device is mobile relative to the interface end along a protection direction, countering the elastic means, up to a stop position wherein it comes in contact with a stop surface linked to the frame.

2. A machine as set forth in claim 1, characterized in that the gripping device is mounted on the interface end in such a way that it can slide in relation to the interface end along a protection direction between its normal position and its stop position.

3. A machine as set forth in claim 2, characterized in that the protection direction is more or less horizontal.

4. A machine as set forth in claim 3, characterized in that the gripping device extends from the interface end along the protection direction in such a way that the container is out of plumb in relation to the sensor.

5. A machine as set forth in claim 4, characterized in that the gripping device is mounted so as to be provided with axial movement on a cylindrical guide rod that is integral with the interface end of the sensor.

6. A machine as set forth in claim 5, further wherein gripping device rotary blocking means are provided in relation to the sensor around the axis of the cylindrical guide rod.

7. A machine as set forth in claim 1, characterized in that the gripping device is mounted so as to be provided with axial movement on a cylindrical guide rod that is integral with the interface end of the sensor.

8. A machine as set forth in claim 1, characterized in that the gripping device and the frame delimit a taut compartment inside of which is arranged the force sensor.

9. A machine as set forth in claim 8, characterized in that the tautness of the compartment is guaranteed by a flexible member that links the gripping device to the frame.

10. A machine as set forth in claim 1, characterized in that the gripping device extends from the interface end along the protection direction in such a way that the container is out of plumb in relation to the sensor.

11. A machine as set forth in claim 10, characterized in that the gripping device is mounted so as to be provided with axial movement on a cylindrical guide rod that is integral with the interface end of the sensor.

12. A machine as set forth in claim 1, characterized in that the sensor is a constant time sensor.

13. A machine as set forth in claim 12, further wherein the weight sensor substantially conforms to the shape of a body that is equipped with at least one central lightening hole so that the base end and interface end are linked to each other by cross bars that are substantially parallel and whose junctions to the base end and interface end are deformable to form hinge points, and wherein the cross bars are substantially parallel to the protection direction.

* * * * *